United States Patent [19]

Kemner et al.

[11] Patent Number: 5,448,479
[45] Date of Patent: Sep. 5, 1995

[54] REMOTE CONTROL SYSTEM AND METHOD FOR AN AUTONOMOUS VEHICLE

[75] Inventors: Carl A. Kemner, Peoria Heights; Joel L. Peterson, East Peoria, both of Ill.

[73] Assignee: Caterpillar Inc., Peoria, Ill.

[21] Appl. No.: 299,448

[22] Filed: Sep. 1, 1994

[51] Int. Cl.⁶ .............................. G06F 165/00
[52] U.S. Cl. ................. 364/424.02; 180/167
[58] Field of Search .......... 364/424.01, 424.02, 364/424.07, 426.04, 424.1, 449; 318/587, 591; 180/167, 168, 169; 348/114, 118, 119, 120

[56] References Cited

U.S. PATENT DOCUMENTS

| | | | |
|---|---|---|---|
| 4,709,265 | 11/1987 | Silverman et al. | 358/108 |
| 4,855,822 | 8/1989 | Narendra et al. | 358/103 |
| 4,924,960 | 5/1990 | Crill | 180/333 |
| 4,986,384 | 1/1991 | Okamoto et al. | 180/167 |
| 5,054,569 | 10/1991 | Scott et al. | 180/167 |
| 5,155,683 | 10/1992 | Rahim | 364/424.02 |
| 5,307,271 | 4/1994 | Everett et al. | 364/424.02 |
| 5,355,506 | 10/1994 | Mariani | 395/800 |

OTHER PUBLICATIONS

Uttal, William R., *Teleoperators*, Scientific American, Dec. 1989, pp. 124–128.
PCT Appl. No. 89/05580; Int'l Pub. Date: Jun. 27, 1991; Int'l Pub. No.: WO 91/09375.
PCT Appl. No. 90/07183; Int'l Pub. Date: Jun. 27, 1991; Int'l Pub. No.: WO 91/09275.

*Primary Examiner*—Michael Zanelli
*Attorney, Agent, or Firm*—Sterne Kessler Goldstein and Fox

[57] ABSTRACT

A system and method for remotely controlling an autonomous vehicle uses a tele-panel to interrupt autonomous operation. Radio communications established between the tele-panel and the vehicle ceases autonomous operation of the vehicle and places the vehicle in a tele-ready mode in which the vehicle will not respond to commands from other tele-panels. Upon communication of a tele-operation request signal to the vehicle, the vehicle enters tele-operation mode. In this mode, the vehicle is responsive only to speed and steering angle requests from the transmitting tele-panel. A unique tele-panel identifier transmitted to the vehicle prevents other tele-panels from gaining control of the vehicle. If communications between the vehicle and the tele-panel identified by the tele-panel identifier are interrupted while the vehicle is in tele-operation mode, the vehicle is locked and will not respond to commands from other tele-panels and will not enter autonomous operation. If communications between the vehicle and the tele-panel identified by the tele-panel identifier are interrupted while the vehicle is in the tele-ready mode, autonomous operation or control by other tele-panels is not prevented.

14 Claims, 4 Drawing Sheets

Fig_1_

Fig_2_

Fig. 3

REMOTE CONTROL SYSTEM AND METHOD FOR AN AUTONOMOUS VEHICLE

BACKGROUND OF THE INVENTION

1. Field of the Invention

This invention relates generally to the control of autonomous vehicles and, more particularly, to a system and method for remotely controlling an autonomous vehicle.

2. Related Art

Caterpillar Inc. of Peoria, Ill., manufactures off-road mining vehicles. For example, the Caterpillar 777C is an off-road mining truck. Commonly owned, allowed U.S. Pat. No. 5,390,125, filed Feb. 18, 1993, "Vehicle Position Determination System and Method," the full text of which is incorporated herein by reference, discloses an autonomous vehicle system for use with a mining vehicle such as the 777C truck.

Commonly owned U.S. patent application Ser. No. 08/299,447, filed on even date herewith, and titled "System for Controlling a Vehicle to Selectively Allow Operation in Either an Autonomous Mode or a Manual Mode," discloses a system for selectively operating an autonomous vehicle in an autonomous mode or manual (i.e., manned) mode.

At times it may be desirable to provide remote-control or tele-control mode for the vehicle. In tele-operation, an operator could control the vehicle using a tele-panel or remote control which communicates commands to the vehicle via radio waves. This mode might be used, for example, by a mechanic to position the vehicle within a service bay. This mode might also be used by a foreman on a job site to temporarily take control of an autonomous vehicle to route it around an obstacle.

To ensure safety, the transition periods between autonomous, manual and tele-operation must be strictly controlled. Moreover, the status (i.e., who is in control) of the vehicle must always be known.

SUMMARY OF THE INVENTION

The invention is a system and method for remotely controlling an autonomous vehicle. The vehicle includes a navigator, a machine control module, an engine control module, a transmission control module and other systems to permit autonomous operation. In autonomous mode, the navigator produces a speed command and a steering angle command for the vehicle. The machine control module receives the speed and steering angle commands from the navigator and produces an engine RPM (revolutions per minute) control signal, a transmission control signal, a brake control signal, and a steering angle control signal to control the lower-level system of the vehicle. The engine control module controls an RPM of the engine of the vehicle in response to the RPM control signal. The transmission control module controls a gear selection in a transmission of the vehicle in response to the transmission control signal.

In tele-operation mode, a tele-panel communicates the speed and steering angle commands to the navigator via a radio link. The navigator then provides these commands to the machine control module to operate the vehicle. Remote control or teleooperation is initiated by establishing radio communications with the vehicle navigator using the tele-panel. The tele-panel transmits a vehicle identifier and a tele-panel identifier to the vehicle. Upon receiving communications from the tele-panel, the vehicle will cease autonomous operation and enter a tele-ready mode. In the tele-ready mode, the vehicle will not respond to commands from other tele-panels and cannot resume autonomous operation. From the tele-ready mode, the tele-panel can instruct the vehicle to enter a tele-operation mode in which the vehicle is responsive to speed and steering angle requests from the tele-panel.

When in the tele-ready or tele-operation modes, the vehicle will not respond to commands from any tele-panel except for the tele-panel identified by the tele-panel identifier. This prevents conflicting messages being sent to a vehicle by more than one tele-panel and assures that control of the vehicle always remains with the tele-panel which first establishes communication.

If communications between the vehicle and the tele-panel identified by the tele-panel identifier are interrupted while the vehicle is in the tele-operation mode, the vehicle will immediately halt and enter a locked state. In the locked state, autonomous operation and control by other tele-panels is prevented. The locked mode provides a mechanism by which an operator may intentionally halt the vehicle and approach it without concern that it will be moved under autonomous control or under control by another tele-panel. If communications between the vehicle and the tele-panel identified by the tele-panel identifier are interrupted while the vehicle is in the tele-ready mode, the vehicle is released and autonomous operation or control by another tele-panel is allowed (i.e., not prevented).

The tele-panel of the invention includes an operator interface panel, an electronics module, a radio transceiver and an antenna. The operator interface panel includes a number of switches/controls which allow an operator to control the vehicle. The switches/controls are input to the electronics module. The electronics module then produces a data packet for transmission to the vehicle. The data packets are transmitted to the vehicle by the transceiver ten times per second.

In the preferred embodiment, the operator interface panel includes an emergency stop switch, a truck selector switch, a transmit switch, a mode select switch, a horn button, a dump switch (for use with an autonomous dump truck), an engine kill switch, and a speed/steering controller. Two indicator lights provide an indication of whether power is provided to the tele-panel and whether the tele-panel is transmitting.

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

The preferred embodiment of the invention is discussed in detail below. While specific part numbers and configurations are discussed, it should be understood that this is done for illustration purposes only. A person skilled in the relevant art will recognize that other components and configurations may be used without parting from the spirit and scope of the invention.

The preferred embodiment of the invention is now described with reference to the figures where like reference numbers indicate like elements. In addition, the left-most digit of each reference number indicates the figure in which the number is first used.

System Overview

Figure 1:
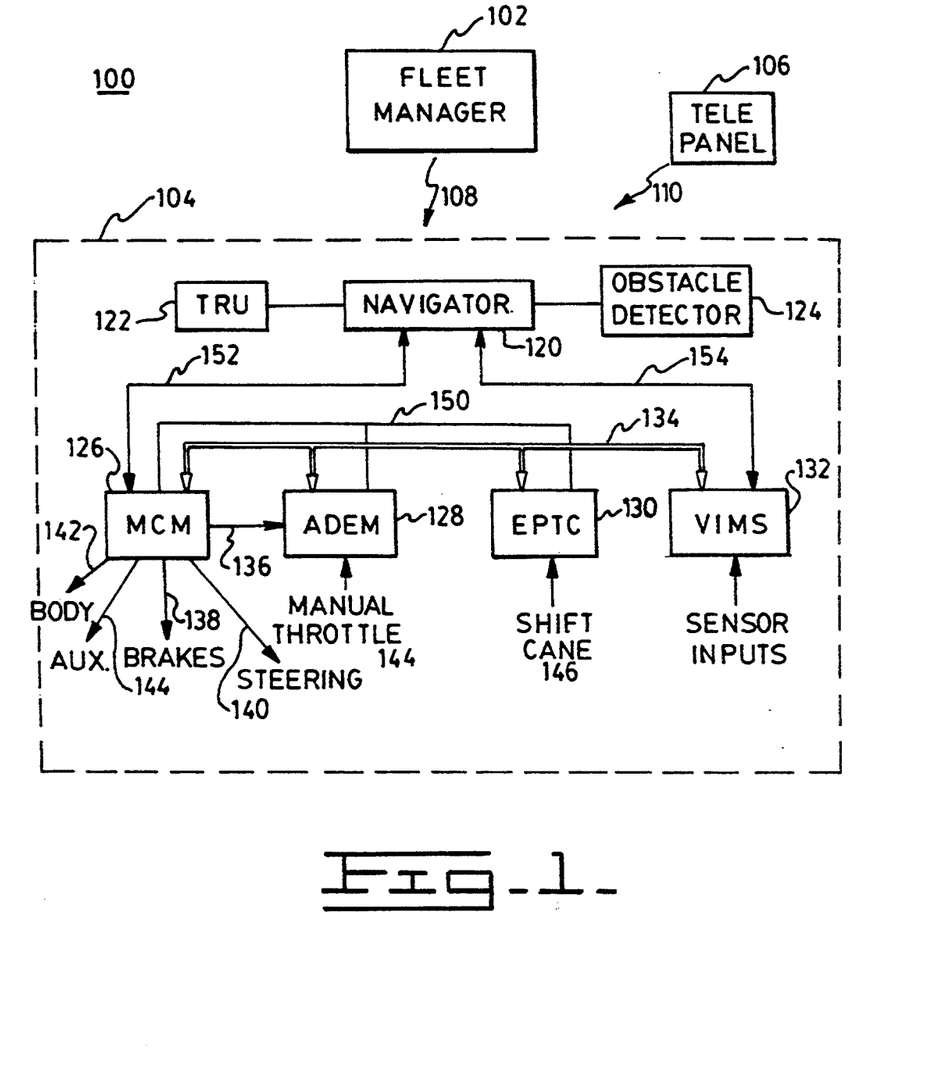
FIG. 1 is a high level block diagram showing the autonomous vehicle system of the invention.

FIG. 1 is a high level block diagram showing an autonomous vehicle system 100. Autonomous vehicle system 100 includes a fleet manager 102, a vehicle control system 104 and a tele-operation panel 106. Fleet manager 102 is configured to manage a fleet of autonomous mining vehicles such as dump trucks. Fleet manager 102 acts like a foreman, assigning tasks to the mining vehicles and tracking their progress as they perform these tasks. Fleet manager 102 communicates with each vehicle via a radio link 108. Each vehicle includes an on-board vehicle control system 104. Vehicle control system 104 permits autonomous operation of the mining vehicle under the control of fleet manager 102. Vehicle control system 104 includes a navigator 120, a truck reference unit (TRU) 122, an obstacle detector 124, a machine control module (MCM) 126, and advanced diesel engine manager (ADEM) 128, an electronic programmable transmission control (EPTC) 130, and a vital information management system (VIMS) 132.

Navigator 120 receives instructions from fleet manager 102 via radio link 108. The instructions include, for example, a work assignment or task. From the task, navigator 120 determines a route to be followed. The route may be, for example, a haul segment between an excavation site and a crusher site in an open pit mining operation.

TRU 122 determines the actual position of the vehicle using the global positioning system (GPS) and an inertial reference unit (IRU). Based on the actual position and the desired route, navigator 120 generates a desired steering angle and a desired speed for the vehicle. Obstacle detector 124 is a radar unit which scans the area in front of the vehicle for obstacles. When obstacle detector 124 detects an obstacle, it provides an indication that an obstacle is detected and/or the location of the obstacle to navigator 120. Navigator 120 may then stop the vehicle or navigate around the obstacle.

Operation of fleet manager 102, navigator 120, TRU 122 (also known as a "vehicle positioning system") and obstacle detector 124 are described in detail in the '540 application which is incorporated by reference above.

Navigator 120, TRU 122 and obstacle detector 124 represent on-board intelligence for the vehicle which allows autonomous control commands to be generated in the form of the speed and steering angle commands. Alternatively, tele-panel 106 may be used to communicate, via radio signals as indicated at 110, steer angle, speed and other commands directly to navigator 120 to allow remote control or tele-operation of the vehicle. In either case, before autonomous or tele-operation can be achieved, the speed and steering angle (as well as other commands) must be serviced.

As detailed in the above-referenced patent application, MCM 126 receives the steering and speed commands (and other commands such as dump bed, sound horn, flash lights, etc.) from navigator 120 over a data bus 152. MCM 126 then controls the vehicle's system to carry out the actions requested by navigator 120. MCM 126 provides status and diagnostic information for the vehicle systems (e.g., steering, brakes, dump body, engine, transmission, etc.) to navigator 120 over data bus 152. MCM 126 controls the vehicle with the aid of ADEM 128 and EPTC 130. MCM 126 provides monitoring and diagnostic information to navigator 120 with the aid of VIMS 132. In addition, VIMS 132 provides monitoring and diagnostic information directly to navigator 120 over a data bus 154.

ADEM 128 controls the speed or RPM (revolutions per minute) of the vehicle's engine. EPTC 130 controls gear selection in the transmission and ensures that the transmission is in the correct gear. VIMS 132 monitors different systems of the vehicle.

Vehicle control system 104 includes three modes of vehicle operation. These include autonomous mode, manual mode and tele-operation mode. Each of these modes is discussed below.

Autonomous Operation

To achieve autonomous operation of the vehicle, the steering angle command and the speed command from navigator 120 must be answered by adjusting the steering angle and speed of the vehicle. MCM 126 compares the speed requested by navigator 120 with the actual vehicle speed and adjusts the vehicle speed, if required, by sending appropriate signals to ADEM 128, EPTC 130 and the vehicle's braking system. MCM 126 communicates these instructions to ADEM 128 and EPTC 130 over a data link 134. In addition, VIMS 132 monitors the status of ADEM 128 and EPTC 130 over, and provides monitored parameters to MCM 126 over, data link 134. In the preferred embodiment, data link 134 is a serial data bus such as a CAT Data Link, available from Caterpillar Inc.

MCM 126 communicates an RPM control signal to ADEM 128 over data link 134 to control engine speed. A second RPM control signal is also sent to ADEM 128 over a redundant line 136.

MCM 126 communicates a transmission control signal to EPTC 130 over data link 134 to select the top gear and direction (i.e., forward or reverse) of the transmission. The vehicle has an automatic transmission which is controlled by EPTC 130. The transmission control signal limits the top gear which may be used by the transmission and selects the direction of travel for the vehicle.

In conjunction with controlling vehicle speed, MCM 126 controls the braking system. In the preferred embodiment of the invention, the vehicle braking system includes a parking brake, a service brake/retarder system, and a secondary brake. MCM 126 controls these different brakes directly via control line 138 which actuates solenoid valves to control air pressure in the three systems. For example, when navigator 120 requests a speed lower than the present speed, MCM 126 decides whether the lower speed should be achieved by reducing engine RPM and/or by applying the service brakes. If braking is required, MCM 126 applies the brake in a smooth manner to avoid locking up the wheels.

In response to the steering angle command from navigator 120, MCM 126 directly controls the vehicle's steering by sending right steer and left steer signals 140 to solenoids which control steering.

In the preferred embodiment of the invention, autonomous vehicle system 100 is used to implement an autonomous haulage system. Using a number of dump trucks (such as the Caterpillar 777C), the haulage system is configured to carry a material such as rock from an excavation site to a 10 crusher site. To permit fully autonomous operation of the vehicle, MCM 126 controls other features of the vehicle, such as dumping of the truck body or bed. MCM 126 produces a dump signal 142 which actuates the hydraulic system of the vehicle to raise and lower the vehicle body. For safety considerations, MCM 126 also controls auxiliary functions of the vehicle such as the horn, lights and backup alarm via an auxiliary control line 144.

Thus, during autonomous operation, MCM 126 indirectly controls the engine and transmission via ADEM 128 and EPTC 130. MCM 126 directly controls the vehicle's braking systems, steering, body (i.e., raise or lower), lights (including head lights and autonomous operation strobe warning lights), horn and back-up alarm.

Manual Operation

MCM 126 implements autonomous operation of a vehicle. It is desirable, however, to also permit manual operation of the vehicle. In a manual mode of operation, the autonomous control features should be transparent and not affect normal functioning of the vehicle. Moreover, for safety, switching between an autonomous, tele (remote control) and manual modes of operation must be tightly controlled so that the vehicle remains in control at all times. The structure and operation of MCM 126 which implements these features of the invention are described below.

MCM 126 permits manual operation by relinquishing control of the vehicle subsystems to an operator. In manual mode, ADEM 128 receives the speed command from an operator actuated throttle or accelerator pedal 144. Similarly, EPTC 130 receives top gear selection and direction commands from a shift cane 146 controlled by the operator. Brakes and steering are manually controlled by the operator using a conventional steering wheel and brake pedal. The body is controlled by a switch which actuates a solenoid in the hydraulic system.

During manual operation, MCM 126 will continue to monitor system parameters but will not interfere with control of the vehicle in any way.

Tele-Operation

In tele-operation of the vehicle, the steering angle command and the speed command from navigator 120 originate from tele-panel 106 via radio link 110. These commands are then sent to MCM 126 as with autonomous operation. From the perspective of MCM 126, autonomous and tele-operation modes are identical.

Transitioning Between Modes of Operation

MCM 126 defaults to manual mode at power-up. Manual mode is indicated to ADEM 128 and EPTC 130 via an auto/manual select signal sent over an auto/-manual control line (AMCL) 150. For example, AMCL 150 is pulled HIGH by ADEM 128 and EPTC 130. When AMCL 150 is high, manual mode is indicated to ADEM 128 and EPTC 130. If autonomous mode is desired, MCM 126 will indicate this to ADEM 128 and AMCL 150 by pulling AMCL 150 LOW.

Transition into autonomous mode will only take place if the following conditions are met:

(1) vehicle speed is zero;
(2) parking brake is on;
(3) shift cane 146 is in neutral;
(4) a first auto/manual switch (located in the cab of the vehicle) is switched to autonomous mode; and
(5) a second auto/manual switch (located near the ground on, for example, the front bumper of the vehicle) is switched to autonomous mode.

If these five conditions are met, MCM 126 will send an auto enable signal to navigator 120 over data bus 152. If navigator 120 is satisfied that all systems are functioning properly (based on status information provided by MCM 126 and VIMS 154), navigator 120 will send an auto mode signal back to MCM 126. Upon receipt of the return auto mode signal from navigator 120, MCM 126 will enter the autonomous mode. This involves MCM 126 switching ADEM 128 and EPTC 130 into autonomous mode by placing the proper signal on AMCL 150 (e.g., by pulling AMCL 150 low). The vehicle controls (e.g., ADEM 128 and EPTC 130) will then be ready to receive instructions from MCM 126, which in turn waits to receive instructions from navigator 120.

Once the vehicle is in autonomous mode, it will not switch back to manual mode until several conditions exist. These conditions reduce the possibility of the vehicle coming out of autonomous mode in an unsafe manner (e.g., while traveling at speed). Before the vehicle can switch from autonomous mode to manual mode, the following conditions must exist:

(1) vehicle speed is zero;
(2) parking brake is on;
(3) shift cane 146 is in neutral;
(4) engine RPM is at low idle; and
(5) both the first and second auto/manual switches are in the manual position.

When these conditions exist, MCM 126 will place ADEM 128 and EPTC 130 in manual mode via AMCL 150. MCM 126 will also de-actuate all solenoid drivers used to control other functions of the vehicle, such as the body, auxiliary functions, brakes and steering.

Tele-operation mode can only be entered from the autonomous mode. Tele-operation mode cannot be entered directly from manual mode. In tele-operation mode, vehicle control system 104 will behave identically to the autonomous mode described above except that navigator 120 will receive a speed command, a steering angle command, and certain auxiliary commands (described below) from tele-panel 106 rather than generate these commands on its own.

Figure 2:
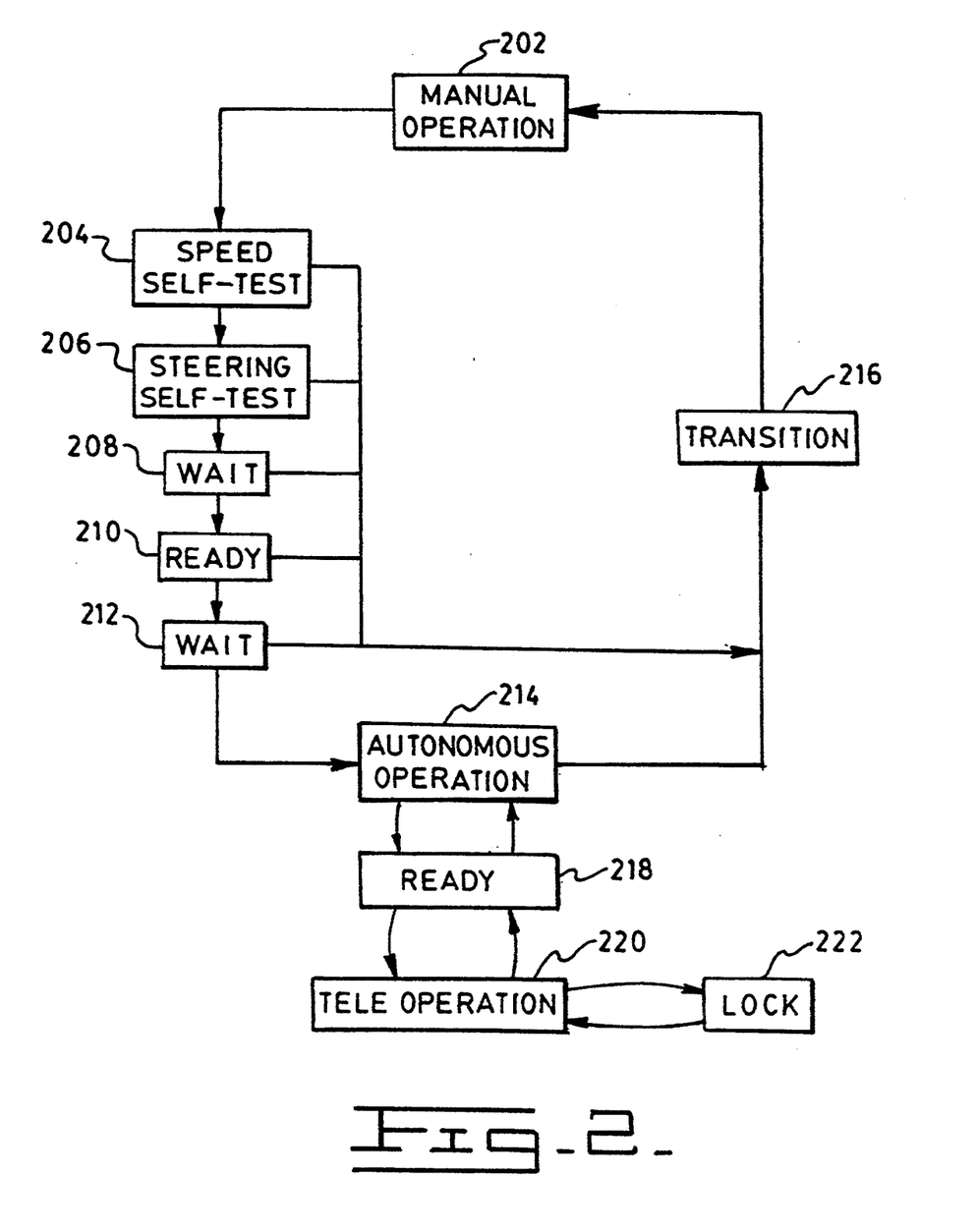
FIG. 2 is a flow chart illustrating the steps involved in switching operation of a vehicle between manual, autonomous and tele modes of operation.

FIG. 2 is a simplified block diagram illustrating the steps followed in transitioning between the modes of vehicle operation. Manual operation is indicated at block 202, autonomous operation is indicated at block 214 and tele-operation mode is indicated at block 220. As indicated above, manual operation 202 is the default of MCM 126 upon power-up. If it is desired to switch into the autonomous operation mode and each of the conditions listed above is met, MCM 126 will cycle through steps 204–212 before reaching autonomous mode 214.

First, a speed self-test is executed as indicated by block 204. The speed self-test checks data link 134 to assure that it is operating properly and that ADEM 128 and EPTC 130 can be controlled by MCM 126. In addition, MCM 126 checks for brake pressure and assures that the brakes can be controlled. Next, in at block 206, a steering self-test is performed. In the steering self-test, the wheels of the vehicle are moved to assure that steering can be controlled, and that the change in the steering angle can be sensed.

In block 208, a wait state is entered. In the preferred embodiment, a five second pause is executed. At the beginning of the pause, the horn is honked and strobe lights are turned ON to warn any person near the vehicle that autonomous operation is being enabled. Thereafter, the vehicle enters an auto-ready mode as indicated at block 210. In the auto-ready mode, MCM 126 is in control of the speed and the steering of the vehicle. The steering angle is set to zero degrees and the speed is maintained at zero miles per hour. At this auto-ready state, the vehicle is essentially in autonomous mode with navigator 120 telling the vehicle to do nothing.

The vehicle will remain in auto-ready mode until a valid command is received from navigator 120. Once a valid command is received, MCM 126 will enter a second wait state as indicated at block 212. The second wait state is similar to the first. The horn is again honked and the strobe lights remain on from the first wait state. This wait state is provided to warn anyone in the vicinity of the vehicle that the vehicle will be moving soon. At the conclusion of this second wait state, the command from navigator 120 is executed to fully enter autonomous mode as indicated at block 214.

If the speed self test at block 204 or the steering self test at block 206 fails, or if either of the auto/manual control switches are toggled to manual mode during sequencing through blocks 208-212, MCM 126 will abort the changeover to autonomous operation and will proceed directly to a transition mode of block 216. Transition performs an orderly shut-down which includes assuring that the vehicle speed is zero, the parking brake is on, and the transmission is in neutral. The vehicle will stay in transition mode until both of the auto/manual control switches are switched to manual mode. At that point, the vehicle can return to manual operation as indicated at block 202.

At any time during autonomous operation (block 214), tele-operation may be initiated. Tele-operation is initiated by tele-panel 106 establishing communications with navigator 120. Establishing communications will cause navigator 120 to immediately stop the vehicle and enter a tele-ready mode as indicated at block 218. In the tele-ready mode, tele-panel 106 has control of the vehicle and transmits commands for zero speed and zero steer angle.

Tele-panel 106 then transmits a tele-operation request signal. This signal causes vehicle control system 104 to enter tele-operation mode as indicated at block 220. In tele-operation mode, the vehicle will respond to commands from tele-panel 106.

As noted above, tele-operation can only be initiated from autonomous mode. Because the auto-ready mode indicated at block 210 is essentially part of autonomous operation, tele-operation can be initiated from this auto-ready state. In that case, the valid command from navigator 120 which initiates wait state 212 will actually originate from tele-panel 106.

If communications between vehicle control system 104 (more specifically, navigator 120) and tele-panel 106 are interrupted while the vehicle is in the tele-operation mode, vehicle control system 104 will enter a locked state as indicated by block 222. In the locked state, autonomous operation is prevented. In addition, the vehicle will not respond to commands from any other tele-panel (as discussed below, each tele-panel has a unique identifier). The vehicle will remain in the locked state until communications with the original tele-panel are re-established. At that time, tele-operation is resumed at block 220.

Autonomous operation at block 214 can only be resumed by properly exiting tele-operation mode. This involves sending a tele-ready mode request signal to cause vehicle control system 104 to enter the tele-ready mode of block 218. From tele-ready mode 218, autonomous operation at block 214 can be entered by discontinuing communications from tele-panel 106.

Communication between Tele-panel 106 and Navigator 120

Figure 3:
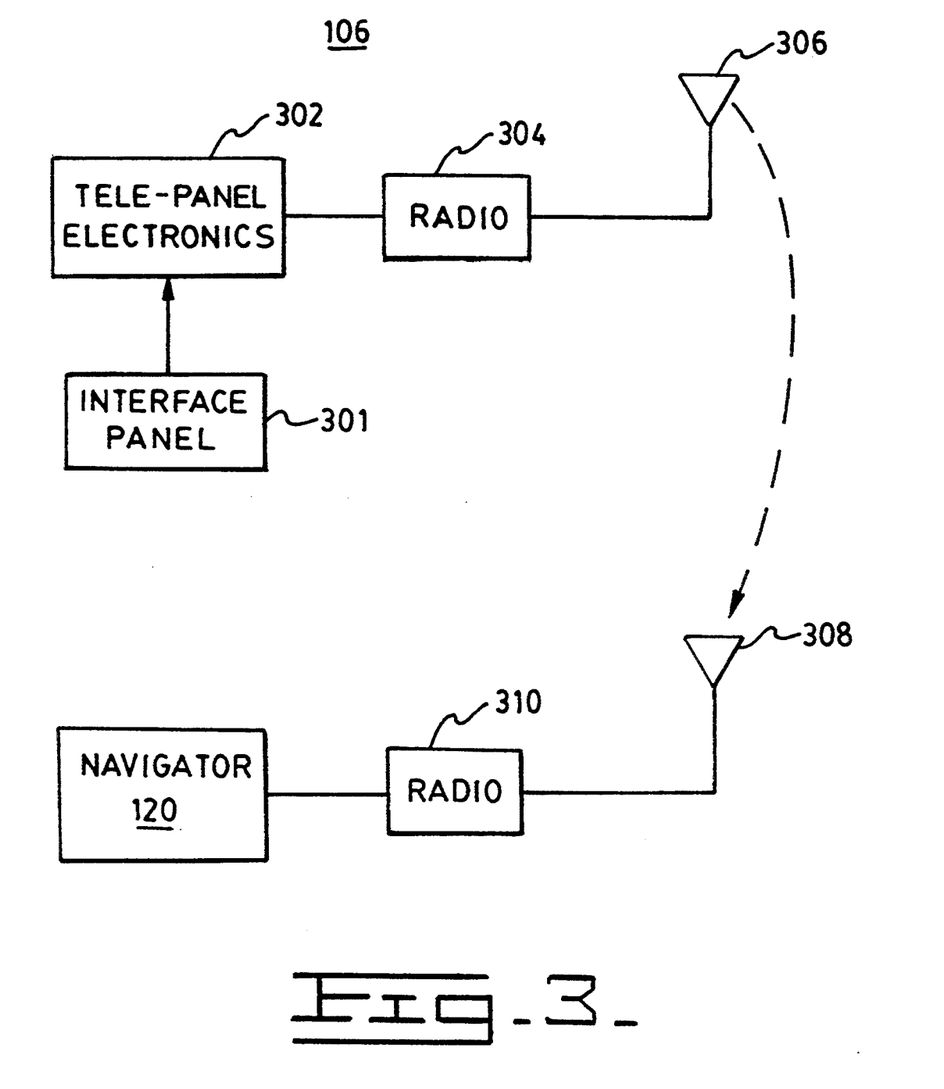
FIG. 3 is a block diagram illustrating the structure of a tele-panel and a vehicle with which the tele-panel communicates.

Tele-panel 106 communicates with navigator 120 via a radio link. This is illustrated in FIG. 3. Tele-panel 106 includes an electronics module 302, a data radio 304 and an antenna 306. Vehicle control system 104 includes an antenna 308 and a data radio 310 for receiving tele-operation signals from tele-panel 106. Data radios 304,310 and antennas 306,308 form a communications link through which tele-commands from electronics module 302 are communicated to navigator 120. The tele-commands sent to the navigator are in a data format identical to the format used by the navigator in the commands that it provides to MCM 126.

Electronics module 302 is a microprocessor-based controller which includes a Motorola 68HC11K4 microcontroller available from Motorola Inc. of Schaumburg, Ill. A microcontroller of this type includes a microprocessor, a read only memory (ROM), a random access memory (RAM) and an input buffer circuit. In the preferred embodiment, radios 304,310 are 800 MHz frequency modulated, high-speed data transceivers available from GLB Inc., Buffalo, N.Y.

Figure 4:
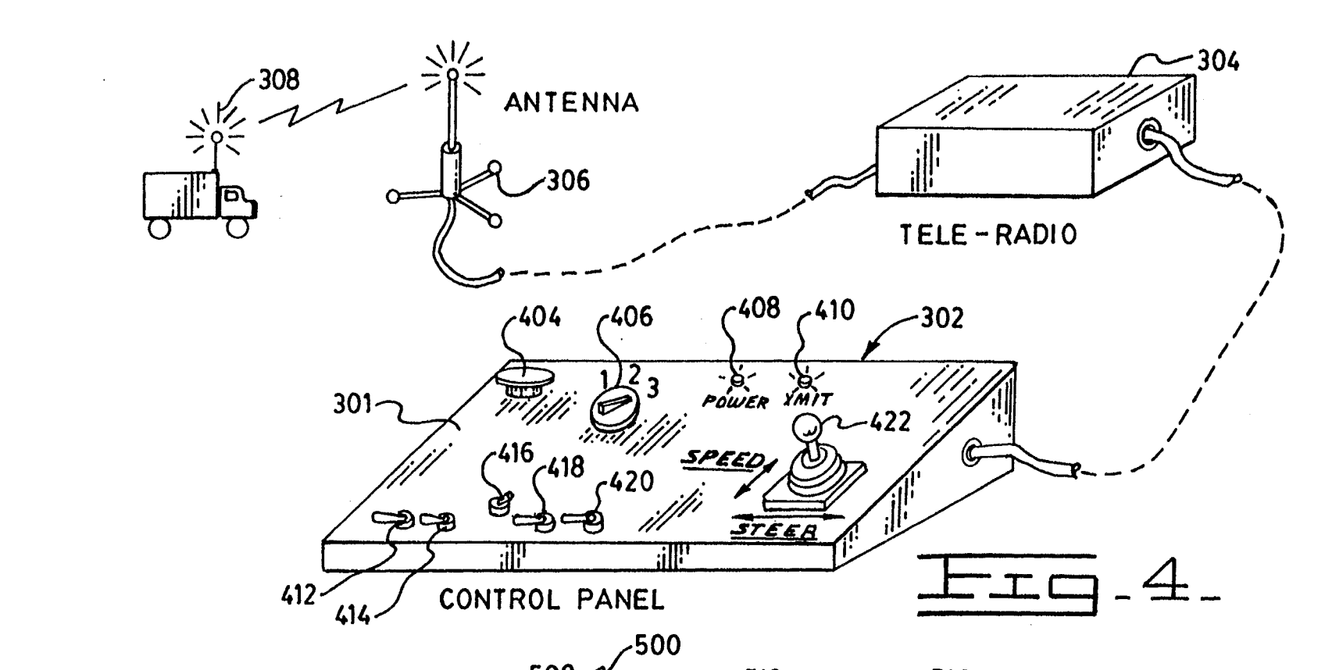
FIG. 4 is a diagram of the tele-panel of the invention showing the operator interface panel.

FIG. 4 illustrates operator interface panel 301 of tele-panel 106. Electronics module 302 is contained with operator interface panel 301. Interface panel 301 includes an emergency stop switch 404, a vehicle selector switch 406, a power indicator light 408, a transmit indicator light 410, a transmit switch 412, a mode select switch 414, a horn switch 416, a bed raise/lower switch 418, an engine start/stop switch 420 and a speed/steering control 422. Each switch/control provides an input to electronics module 302. Each indicator light 408,410 is driven by electronics module 302. Based on the positions of the various switches, electronics module 302 formats a data packet to be transmitted by radio 304 to the vehicle.

Emergency stop switch 404 provides a "panic" stop button. If depressed, switch 404 will cause the vehicle to come to an immediate stop. Vehicle selector switch 406 is a rotary switch used to select the vehicle which tele-panel 106 will control. As discussed below, each vehicle has a unique identification (ID) number. Transmit switch 412 is a single pole toggle switch used to turn on transmission by tele-panel 106. Mode select switch 414 is a single pole toggle switch used to select between tele-ready mode 218 and tele-operation mode 220. Horn button 416 is a momentary, normally open, push button switch used to sound the horn of the selected vehicle. Switch 418 is a single pole toggle switch used to raise/lower the bed of a dump truck in the preferred embodiment of the invention. Switch 420 is a single pole toggle switch for turning the vehicle's engine on or off.

In the preferred embodiment, toggle switches 412, 414, 418 and 420 have protective covers to prevent them from being inadvertently toggled. Furthermore, the covers for transmit switch 412 and mode select switch 414 will bump those switches to an off position when closed. For transmit switch 412, the off position corresponds to transmit off. For mode select switch 414, the off position corresponds to the tele-ready mode.

Speed/steering control 422 is a two-axis joy stick used to control the speed and steering for the vehicle. Moving the joy stick forward increases the vehicle's forward speed. Moving the joy stick in a reverse direction will increase the vehicle's reverse direction speed. Moving the joy stick to the left will cause the vehicle to steer left, and moving the joy stick to the right will cause the vehicle to steer right.

Indicator light 408 indicates whether power is being supplied to tele-panel 106. Indicator light 410 indicates whether tele-panel 106 is transmitting.

In the preferred embodiment, electronics module 302 provides a data packet to radio 304 ten times per second for transmission. This data packet is then broadcast to navigator 120 via the radio link. The contents of each data packet is controlled by the positions of the various panel controls 404, 406, 412, 414, 416, 418, 420 and 422. As set forth above, electronics module 302 includes a microcontroller, such as the Motorola 68HC11K4. The various panel controls of interface panel 301 are connected directly to an input buffer of the microcontroller. The microcontroller produces the data packet containing commands based on the positions of the various panel controls.

Figure 5:
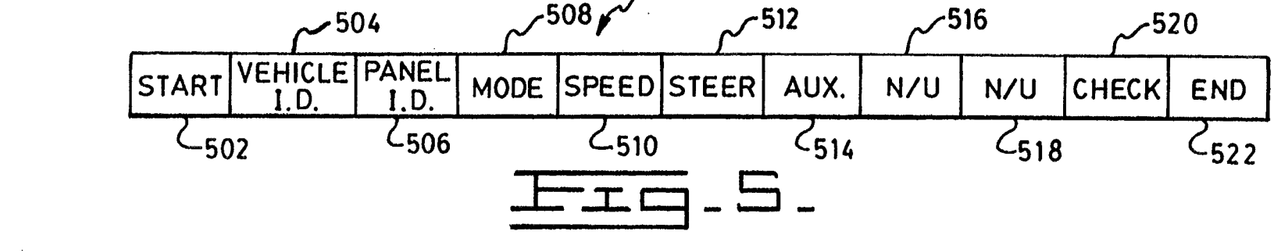
FIG. 5 is a diagram illustrating the bytes of information in a data packet 500 according to the invention.

The format of the transmitted data packet is illustrated in FIG. 5. Each data packet 500 includes eleven bytes of information. These include a start byte 502, a vehicle ID byte 504, a panel ID byte 506, a mode byte 508, a speed byte 510, a steering byte 512, an auxiliary byte 514, two unused bytes and 518, a check sum byte 520 and an end byte 522. Each of these is discussed in detail below:

| Byte | Function |
| --- | --- |
| Start 502 | This byte indicates beginning of data packet. |
| Vehicle ID 504 | This byte identifies the vehicle to which the message is directed. |
| Panel ID 506 | This byte indicates the identification number for the tele-panel. Each tele-panel has a unique identification number. |
| Mode 508 | This byte indicates whether tele-ready mode or tele-operation mode is requested. |
| Speed 510 | This byte indicates a desired vehicle speed. |
| Steering 512 | This byte indicates a desired vehicle steering angle. |
| Auxiliary 514 | This byte indicates, for example, whether a dump truck's bed should be raised or lowered and whether the horn should be sounded. |
| Not Used 516 and Not Used 518 | These bytes are not used for data but are present in the data packet to keep the packet format consistent with what MCM 126 receives from navigator 120. This consistent format allows the navigator to pass the data packet directly on to MCM 126 for control of the vehicle's various systems. |
| Check Sum 520 | This byte is a modulo 256 summation of the first nine bytes of the data packet. It is used for error detection. |
| End 522 | This byte indicates the end of the data packet. |

Operation of Tele-panel 106

If it is desired to take control of a vehicle which is operating autonomously, an operator proceeds as follows. First, the operator uses vehicle selector switch 406 to select a vehicle to be controlled. Next, the operator toggles transmit switch 412 to turn transmit on. This will cause the selected vehicle to immediately halt and standby (in tele-ready mode 218) for further instructions from the transmitting tele-panel 106.

Next, the operator toggles mode select switch 414 to tele-operation. This activates the switches and controls on the face of interface panel 301 so that input from steering/speed controller 422 controls the data in speed and steering bytes 510,512 and so that the switches 416, 418 and 420 control the data in auxiliary byte 514. In tele-operation mode, navigator 120 will pass the data packets received from the tele-panel directly to MCM 126. MCM 126 then control the vehicle's steering, speed and auxiliary functions based on the data contained in data packets 500.

To properly release the vehicle from tele-control, an operator stops the vehicle via speed/steering control 422, toggles mode select switch 414 to teleready mode 218 and then turns off transmit switch 412. Once the transmit switch is turned off, navigator 120 is released to resume autonomous operation or control by another tele-panel.

A second tele-panel will not be permitted to take control of a vehicle while the transmit switch of a first tele-panel is still in the on position (i.e., the vehicle is receiving data packets from the first tele-panel). The unique tele-panel identification transmitted in the first data packet received by the vehicle is stored in a memory within navigator 120. Each subsequent data packet is then checked to assure that it is from the same tele-panel. This feature assures positive control of a vehicle at all times.

If at any time during tele-operation of a vehicle, the signal transmitted by the tele-panel is lost, the vehicle will immediately stop and enter locked state 222. This might occur, for example, if transmit switch 412 is turned off while mode select switch 414 indicates tele-operation. In the locked state, autonomous operation is prevented and tele-operation from other tele-panels is prevented. The vehicle can only exit the locked state by re-establishing communications with the original tele-panel.

This feature further prevents ambiguity of control. Furthermore, this feature can be used to intentionally lock an autonomous vehicle. For example, in an autonomous mining operation, a mechanic may want to approach an autonomous truck for service. By using the tele-panel to stop and lock the vehicle before approaching it, he can guard his personal safety. Once he has approached the vehicle, he may place it in manual mode 202 or transition mode 216 using the auto/manual select switch located on the bumper of the truck to further assure that it will not move during the service.

While the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. A method for remotely controlling an autonomous vehicle, comprising:
   establishing radio communications with the vehicle via a tele-panel, wherein a vehicle identifier and a tele-panel identifier are transmitted to the vehicle, and wherein establishing radio communications ceases autonomous operation of the vehicle and places the vehicle in a tele-ready mode in which the vehicle will not respond to commands from other tele-panels;

communicating a tele-operation request signal to the vehicle, said tele-operation request signal placing the vehicle in a tele-operation mode in which the vehicle is responsive to speed and steering angle requests from the tele-panel;

if communications between the vehicle and said tele-panel identified by said tele-panel identifier are interrupted while the vehicle is in said tele-operation mode, halting operation of the vehicle, preventing autonomous operation of the vehicle, and preventing control of the vehicle by any other tele-panel; and if communications between the vehicle and said tele-panel identified by said tele-panel identifier are interrupted while the vehicle is in said tele-ready mode, allowing autonomous operation of the vehicle and allowing control of the vehicle by another tele-panel.

2. The method of claim 1, wherein said step of establishing radio communications comprises:

transmitting data packets from said tele-panel to said vehicle, each data packet including a vehicle identification byte, a tele-panel identification byte, a mode byte, a speed byte, and a steering byte.

3. The method of claim 2, wherein said step of transmitting data packets comprises:

transmitting data packets at least ten times per second using a frequency modulation scheme and a continuous carrier wave.

4. The method of claim 1, wherein said step of establishing radio communications comprises:

transmitting data packets from said tele-panel to said vehicle, each data packet including a start byte, a vehicle identification byte, a tele-panel identification byte, a mode byte, a speed byte, a steering byte, an auxiliary byte, a check byte and an end byte.

5. The method of claim 4, wherein said step of transmitting data packets comprises:

transmitting data packets at least ten times per second using a frequency modulation scheme and a continuous carrier wave.

6. The method of claim 1, further comprising a step before said step of establishing radio communications of:

selecting via said tele-panel a vehicle to be controlled from a plurality of such vehicles.

7. A system for remotely controlling an autonomous vehicle, comprising;

a tele-panel having control means for allowing an operator to generate speed and steering angle commands, mode select means for allowing an operator to select an operational mode of said vehicle, processor means for receiving said speed and steering angle commands from said control means and said selected operational mode from said select means, for generating a vehicle identifier and a tele-panel identifier, and for formatting said vehicle identifier, said tele-panel identifier, said selected operational mode, and said speed and steering angle command into a data packet, and transmitter means for establishing communications with the vehicle and for transmitting said data packet to the vehicle, and vehicle control means, mounted on said vehicle, for receiving said communications from said tele-panel and for controlling operation of the vehicle in response thereto, said vehicle control means having receiver means for receiving said communications from said transmitter means, mode set means for placing the vehicle in a tele-ready mode in response to said data packet received from said tele-panel and for placing the vehicle in tele-operation mode when said selected operational mode of said data packet indicates tele-operation mode, means for producing vehicle speed and steering angle control signals in response to speed and steering angle commands in said data packet, and means for halting operation of the vehicle, preventing autonomous operation of the vehicle, and preventing control of the vehicle by another tele-panel if communications between the vehicle and said tele-panel identified by said tele-panel identifier are interrupted while the vehicle is in said tele-operation mode.

8. The system of claim 7, wherein said control means is a two-axis joy stick.

9. The system of claim 8, wherein said mode select means is a switch allowing selection of either autonomous mode or tele-operation mode.

10. The system of claim 9, wherein said processor means is a microcontroller.

11. The system of claim 10, wherein said transmitter means is a high speed data transceiver.

12. The system of claim 11, wherein said receiver means is a high speed data transceiver.

13. The system of claim 12, wherein said mode set means and said means for halting comprise a vehicle navigator.

14. The system of claim 13, wherein said means for producing vehicle speed and steering angle control signals comprises a machine control module.

* * * * *